US006504263B2

(12) United States Patent
Mitsuzuka

(10) Patent No.: US 6,504,263 B2
(45) Date of Patent: Jan. 7, 2003

(54) IN-CAR-DEVICE CONTROLLER

(75) Inventor: Katsuya Mitsuzuka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 84 days.

(21) Appl. No.: 09/736,660

(22) Filed: Dec. 13, 2000

(65) Prior Publication Data

US 2001/0004169 A1 Jun. 21, 2001

(30) Foreign Application Priority Data

Dec. 14, 1999 (JP) .......................................... 11-354605
Oct. 31, 2000 (JP) ...................................... 2000-333378

(51) Int. Cl.[7] .................................................. B60L 1/00
(52) U.S. Cl. ........................ 307/10.1; 307/9.1; 307/113
(58) Field of Search ................................ 307/9.1, 10.1, 307/113

(56) References Cited

U.S. PATENT DOCUMENTS 5,359,230 A * 10/1994 Namiki et al. ............. 307/10.1
5,990,571 A 11/1999 Sato et al.
6,114,776 A * 9/2000 Ito et al. ..................... 358/461

FOREIGN PATENT DOCUMENTS

JP 04-139516 * 5/1992

OTHER PUBLICATIONS

Patent Abstracts of Japan, Pub. No.: 10–334765, Pub. date: Dec. 18, 1998.*
Patent Abstracts of Japan, Pub. No.: 04–139516, Pub. date: May 13, 1992.*

* cited by examiner

*Primary Examiner*—Brian Sircus
*Assistant Examiner*—Sharon Polk
(74) *Attorney, Agent, or Firm*—Brinks Hofer Gilson & Lione

(57) ABSTRACT

An in-car-device controller permits a switch unit to be easily replaced. Switch units formed by control switches and keytops are installed to unit mounts. The types of the switch units are identified by the unit mounts by detecting the different shapes of switching driving portions formed at the distal ends of the keytops. The unit mounts are provided with detection switches for detecting the presence of the keytops. A control unit detects detection switch signals from the detection switches thereby to determine the presence of the key tops. If the control unit decides that any one of the keytops has been removed from the unit mounts, then the control unit turns OFF at least the control function associated with the removed keytop.

2 Claims, 6 Drawing Sheets

CONTROL SWITCH

| | SW-A | SW-B | SW-C | SW-D | SW-E | SW-F | SW-G |
|---|---|---|---|---|---|---|---|
| OFF | 000 | 000 | 000 | 000 | 000 | 000 | 000 |
| ON | 001 | 010 | 100 | 011 | 101 | 110 | 111 |

IN-CAR-DEVICE CONTROLLER

BACKGROUND OF THE INVENTION

1. Field of the Invention

The present invention relates to an in-car-device controller equipped with a plurality of switch units issuing various control instructions. More particularly, the present invention relates to an in-car-device controller that automatically identifies the type of a switch unit and automatically conducts control instructed by the switch unit even if the switch unit instructing particular control is installed and operated in a different unit mount.

2. Description of the Related Art

Hitherto, the panel surface of an automobile instrument panel is provided with a plurality of manual switches for air conditioning in an automobile compartment. These manual switches are selectively operated to switch between a heating mode and a cooling mode of an air conditioner or to change a set temperature in an automobile compartment.

In recent years, there has been a demand for installing one or plural optional manual switches for operating optional devices on the panel surface of an instrument panel, in addition to the group of manual switches for air conditioning. Such a demand has arisen to deal with a variety of user options. To meet the demand, there has been proposed a switching device that accommodates a plurality of different types of optional manual switches.

This type of switch unit, which has conventionally been proposed, includes unit mounts to which a plurality of switch units equipped with optional manual switches can be installed. One switch unit or plural different types of switch units can be arbitrarily installed to the unit mounts. Regardless of the types of the switch units installed to the unit mounts, the functions of the installed switch units can be implemented by a central control unit (CPU) of a controller, which processes a switching signal received from the switch unit.

As this type of switch unit, there has been known another in-car device controller adapted to automatically identify the types of switch units when the switch units are installed to the unit mounts.

The known switch unit is provided with a recognition signal generating means for issuing a unique switch signal for each different switch when the switch is turned ON. Furthermore, a control circuit unit is provided with a switch identifying circuit that issues an output signal for driving a particular load in response to a recognition signal. The switch unit is configured to read a switch signal from the recognition signal generating means of a replaced cassette-type switch assembly by the switch identifying circuit. The recognition signal generating means has different internal interconnections for different types of switches. When a contact of a switch is closed, a switch signal uniquely assigned to that switch is output, and the switch signal serves as a recognition signal indicating the function of the switch. The switch identifying circuit has input terminals and logic circuits associated with output terminals of the switches to process switch signals received from the switches by the logic circuit so as to output drive signals to loads associated with the functions of the switches.

Thus, the switch unit obviates the need for changing the circuit configuration of a control circuit unit when installing or replacing a switch, and enables the operation associated with the function of each switch to be performed simply by changing a plurality of cassette-type switch assemblies which output unique switch signals.

On the other hand, however, the known switch unit discussed above poses the following disadvantage. The switch units are adapted to issue different switch signals from the recognition signal generating means by providing the switches with different interconnections. This means that there must be as many switches with different interconnections as different functions to be implemented. Hence, no general-purpose switches can be used, and the mounting positions of the switches on a printed circuit board must be changed for different functions, adding to manufacturing cost. Furthermore, the number of available combinations of interconnections in the switches is limited, and a switch identifying circuit naturally has limited combinations of logic circuits, making it difficult to accommodate increasing control functions.

The assignee has previously proposed some controllers for in-car devices to improve the disadvantages of the prior technologies described above.

A first controller for in-car devices that has been proposed is constructed by a plurality of different types of switch units that incorporate identifying elements having different circuit constants, and switch unit identifying sections for detecting values that depend on the circuit constants of the identifying elements thereby to identify the types of the switch units when they are attached to the unit mounts. The unit mounts of a second controller for in-car devices that has been proposed are equipped with a plurality of sets of switches having a plurality of driving pins that permit contacts to be independently switched. The shape of each keytop attached to each switch mounting section has a different shape, and a different combination of the driving pins can be used for each keytop so as to issue a different recognition signal from each different switch. A third controller for in-car devices that has been proposed is constructed by a plurality of types of switch units incorporating different diode connection circuits, and a switch unit identifying section that digitally identifies the type of a mounted switch unit by detecting an output signal of a diode connection circuit when the switch unit is mounted on the unit mount.

These in-car-device controllers obviate the need for providing switches with different interconnections, thus saving cost. The first and the third in-car-device controllers are capable of generating signals that can be identified by the switch unit identifying section in an extensive range by changing the identifying elements or the diode connection circuits, enabling them to accommodate more control functions.

However, as in the case of the in-car-device controllers previously proposed by the assignee, the conventional in-car-device controllers in which the controllers automatically identify the types of the switch units when the switch units are attached to the unit mounts are not provided with any means for stopping a control function that has been implemented by turning the switch unit ON if the switch unit is removed after being attached to the unit mount to carry out its function. This is inconvenient in that the function associated with the switch unit cannot be cleared unless the switch unit, that has once been detached, is placed back onto the unit mount to turn it OFF.

More specifically, according to the in-car-device controllers previously proposed by the assignee, if a switch unit is attached to one unit mount, the type of the switch unit is automatically identified by the control unit, and a predetermined control function is implemented by turning the switch unit ON. Thus, the switch unit is removed from the unit mount after turning the switch unit ON, and another type of switch unit is mounted on the same unit mount. The type of the newly attached switch unit is automatically recognized by the controller, and another control function is implemented by turning the newly attached switch unit ON. However, the preceding control function that has been implemented by the detached switch unit would continue to be carried out. To stop the previously implemented function, therefore, the switch unit that has been removed must be mounted back onto the unit mount to turn the function OFF.

Hence, in these conventional types of in-car-device controllers, another switch unit cannot be mounted unless it has been confirmed that the control function associated with a switch unit to be removed from the unit mount has been cleared. If a switch unit carrying out its associated control function is erroneously removed, then the switch unit has to be mounted back on to turn it OFF; otherwise, another switch unit cannot be mounted. Thus, the conventional types of controllers disadvantageously require great efforts in replacing the switch units.

SUMMARY OF THE INVENTION

The present invention has been made with a view toward solving the problems of the conventional art described above, and it is an object of the present invention to provide an in-car-device controller that allows a switch unit to be easily replaced.

To this end, according to a first aspect of the present invention, there is provided an in-car-device controller equipped with a plurality of types of switch units associated with different control functions, a control switch and a keytop constituting each one of the switch units, a plurality of unit mounts to which the switch units are individually installed, detection switches individually provided on the plural unit mounts, and a control unit that automatically identifies the types of the switch units mounted on the unit mounts, detects a detection switch signal issued from a detection switch when the switch unit or keytop constituting part of the switch unit is removed from a unit mount, and switches OFF at least the control function associated with the removed switch unit or keytop.

With this arrangement, when a switch unit or a keytop is removed from a unit mount, a detection switch is actuated to cause the control unit to automatically recognize that the switch unit or the keytop has been removed from the unit mount, and at least the control function associated with the removed switch unit or keytop is switched OFF. Therefore, a user does not have to check if the control function associated with a control switch has been turned OFF before removing a switch unit or a keytop from a unit mount. Moreover, there will be no need to mount a switch unit or a keytop back onto a unit mount after it has been is removed. Thus, the switch units can be replaced more easily in an in-car-device controller adapted to automatically identify the type of a switch unit by the control unit when the switch unit is attached to a unit mount.

According to a second aspect of the present invention, there is provided an in-car-device controller equipped with a plurality of types of switch units individually associated with different control functions, a plurality of unit mounts to which the switch units are individually installed, a single cover installed on a front surface of each of the plural unit mounts such that it can be opened and closed, a cover detection switch for detecting the opening and closing of the cover, and a control unit that automatically identifies the type of a switch unit attached to the unit mount, detects a cover detection switch signal output from the cover detection switch when the cover is opened, and switches OFF the control functions associated with all switch units that have been attached to the unit mounts.

With this arrangement, whenever a switch unit or a keytop is removed from a unit mount, the cover is opened first, since the cover is provided on the front of the unit mount. Hence, an output signal of the cover detection switch interlocked with the cover is detected, and the control functions associated with all switch units attached to the unit mounts are automatically turned OFF. This makes it possible to provide the same advantages described above simply by adding a single detection switch, and the configuration of an in-car-device controller can be further simplified.

DESCRIPTION OF THE PREFERRED EMBODIMENTS

First Embodiment

Figure 1:
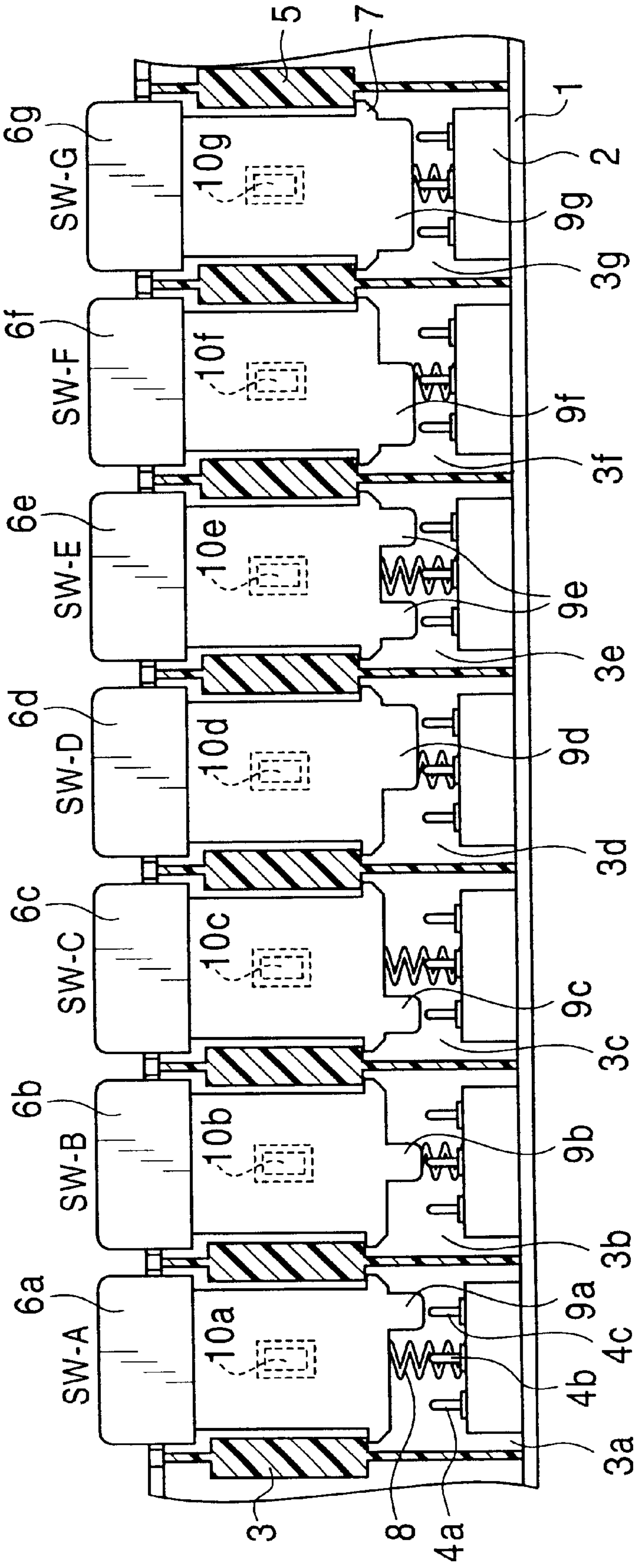
FIG. 1 is a sectional view of an essential section of an in-car-device controller according to a first embodiment of the present invention.
Figure 3:
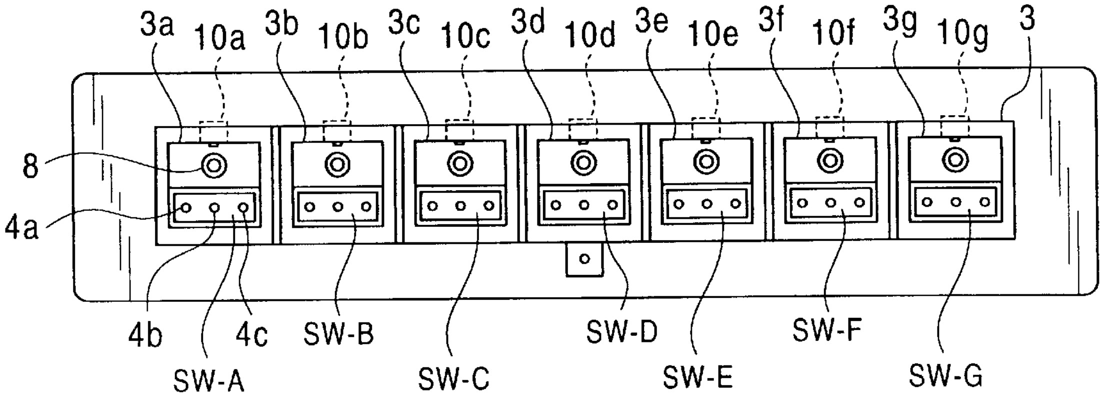
FIG. 3 is a front view of an in-car-device controller according to the first embodiment from which keytops have been removed.
Figure 4:
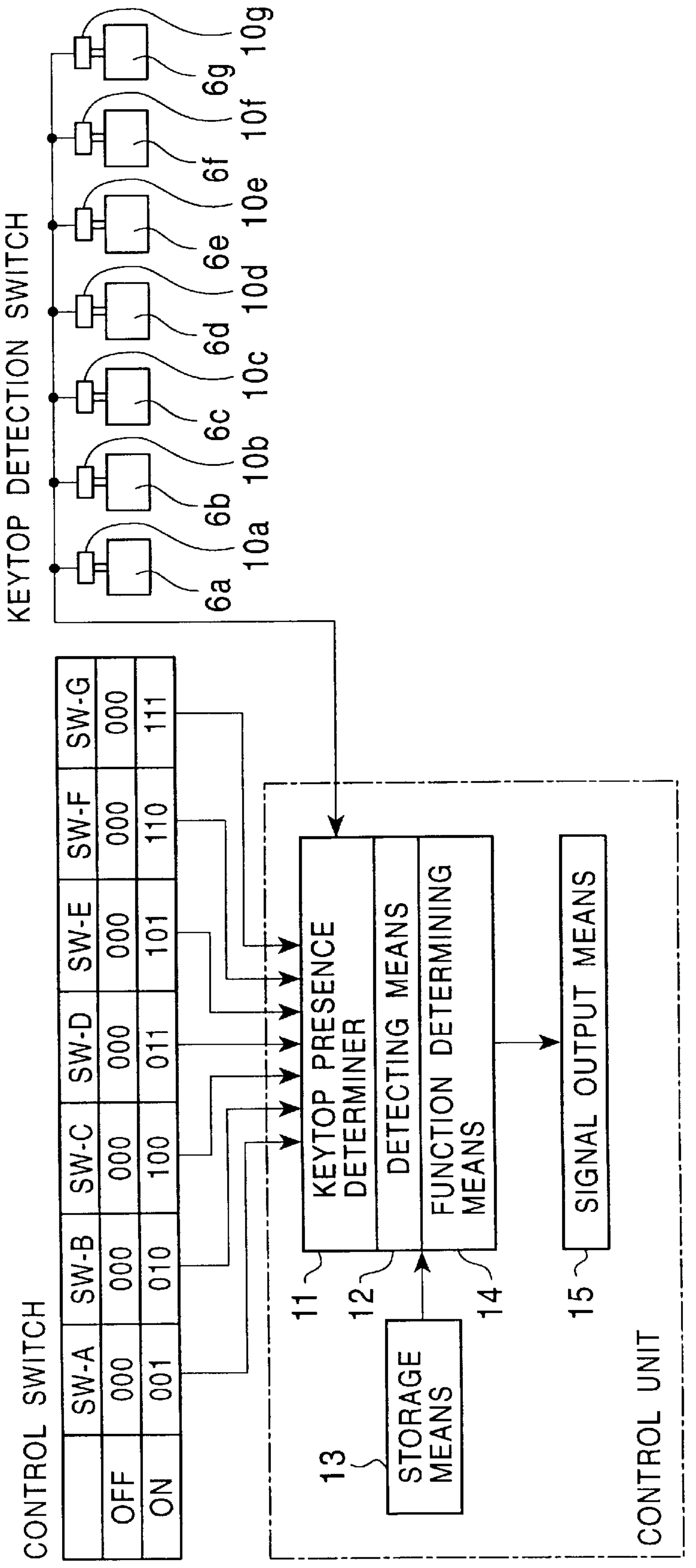
FIG. 4 is a block diagram of an in-car-device controller according to the first embodiment.
Figure 5:
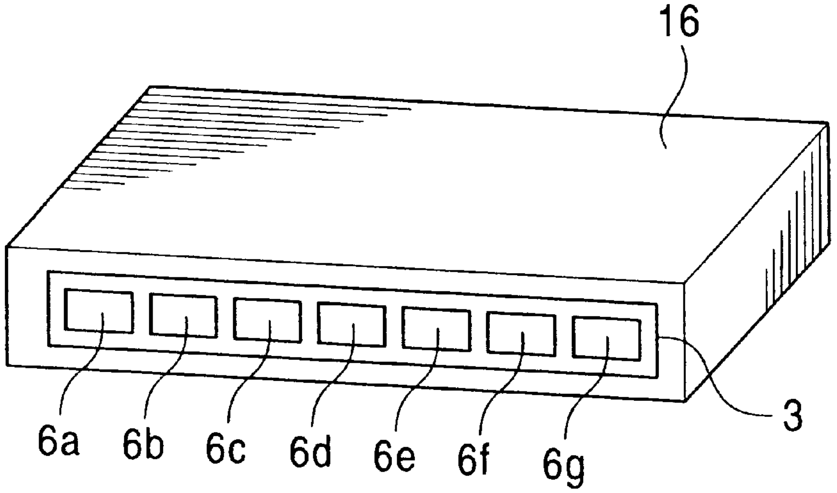
FIG. 5 is a perspective view of a panel unit on which an in-car-device controller according to the first embodiment is mounted.

A first embodiment of an in-car-device controller in accordance with the present invention will be described in conjunction with FIG. 1 through FIG. 5. FIG. 1 is a sectional view of an essential section of an in-car-device controller according to a first embodiment of the present invention, FIG. 2 is a sectional view of an in-car-device controller according to the first embodiment viewed from another direction, FIG. 3 is a front view of an in-car-device controller according to the first embodiment from which keytops have been removed, FIG. 4 is a block diagram of an in-car-device controller according to the first embodiment, and FIG. 5 is a perspective view of a panel unit on which an in-car-device controller according to the first embodiment is mounted.

Figure 2:
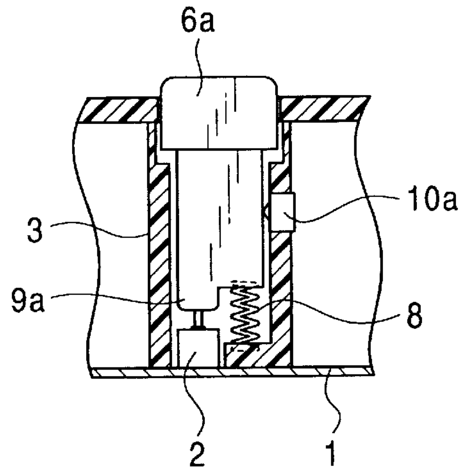
FIG. 2 is a sectional view of an in-car-device controller according to the first embodiment viewed from another direction.

Referring to FIG. 1 and FIG. 2, in an in-car-device controller according to the first embodiment, seven control switches 2 (hereinafter, reference characters SW-A through SW-G will be assigned, as necessary) are mounted on a printed circuit board 1. The printed circuit board 1 is secured to an internal bottom surface of a housing 3 accommodating unit mounts 3*a* through 3*g*. The control switch SW-A is a triple momentary type push switch having three driving pins 4*a*, 4*b*, and 4*c* jutting out from the top surface of its enclosure. The control switch SW-A incorporates three contacts (not shown) that are closed by being pressed by the driving pins 4*a*, 4*b*, and 4*c*. The remaining control switches SW-B through SW-G are the same triple push switches.

The housing 3 has seven unit mounts 3*a* through 3*g* corresponding to the control switches 2. A stopper stepped section 5 is formed on the inner wall of each of the unit mounts 3*a* through 3*g*. First through seventh keytops 6*a* through 6*g* making up the switch units together with the printed circuit board 1 and the control switches 2 are slidably inserted in the unit mounts 3*a* through 3*g*. Stopper hooks 7 engaging the stopper stepped sections 5 provided on the inner walls of the unit mounts 3*a* through 3*g* are formed on side walls of the keytops 6*a* through 6*g*. Coil springs 8 are provided between the lower surfaces of the keytops 6*a* through 6*g* and the bottom surface of the housing 3. The keytops 6*a* through 6*g* are constantly urged by the coil springs 8 in a direction for projecting from the unit mounts 3*a* through 3*g*. The stopper hooks 7 abut against the stopper stepped sections 5, thereby preventing the keytops from coming off the unit mounts 3*a* through 3*g*. Driving portions 9*a* through 9*g* capable of simultaneously pressing one or plural of the driving pins 4*a* through 4*c* of associated control switches 2 are formed on the bottom surfaces of the keytops 6*a* through 6*g*.

In the embodiment shown in FIG. 1, the driving portion 9*a* capable of pressing only the driving pin 4*c* of the control switch SW-A is formed on the first keytop 6*a*. Similarly, the driving portion 9*b* capable of pressing only the driving pin 4*b* of the control switch SW-B is formed on the second keytop 6*b*, the driving portion 9*c* capable of pressing only the driving pin 4*a* of the control switch SW-C is formed on the third keytop 6*c*, the driving portion 9*d* capable of pressing the driving pin 4*b* and the driving pin 4*c* of the control switch SW-D is formed on the fourth keytop 6*d*, the driving portion 9*e* capable of pressing the driving pin 4*a* and the driving pin 4*c* of the control switch SW-E is formed on the fifth keytop 6*e*, the driving portion 9*f* capable of pressing the driving pin 4*a* and the driving pin 4*b* of the control switch SW-F is formed on the sixth keytop 6*f*, and the driving portion 9*g* capable of pressing all the driving pins 4*a* through 4*c* of the control switch SW-G is formed on the seventh keytop 6*g*.

In the housing 3, detection switches 10*a* through 10*g* for detecting the presence of the keytops 6*a* through 6*g* are provided for the unit mounts 3*a* through 3*g*, as shown in FIG. 1 through FIG. 3. These detection switches 10*a* through 10*g* are adapted to output a detection switch signal "1" if the keytops 6*a* through 6*g* are mounted on the unit mounts 3*a* through 3*g*, while they output a detection switch signal "0" if the keytops 6*a* through 6*g* have been removed from the unit mounts 3*a* through 3*g*.

Referring to FIG. 4, depending on which one of the keytops 6*a* through 6*g* attached to the unit mounts 3*a* through 3*g* is depressed, corresponding one of the control switches SW-A through SW-G outputs a switch signal "001", "010", "100", "011", "101", "110", or "111" indicating the ON state of the corresponding one of the control switches SW-A through SW-G. These switch signals are applied as recognition signals to the control unit. If none of the keytops 6*a* through 6*g* are depressed, then a switch signal "000" indicating the OFF state of the control switches SW-A through SW-G is output and applied to the control unit.

The control unit is equipped with a keytop presence determiner 11 that receives the detection switch signals from the keytop detection switches 10*a* through 10*g*, a detecting means 12 for detecting the switch signals from the control switches SW-A through SW-G, a storage means 13 for storing control functions set for the keytops 6*a* through 6*g*, a function determining means 14 for determining the control functions of the keytops 6*a* through 6*g* based on a detection result of the detecting means 12 and the storage means 13, and a signal output means 15 for outputting a control signal corresponding to the control function determined by the function determining means 14. In an in-car-device controller according to this embodiment, the switch units are assigned to the control functions for traction control, suspension control, driver's seat heater, driver's seat backrest heater, passenger's seat heater, passenger's seat backrest heater, and retracting mirrors. A table indicating the control functions and the control signals associated with the control functions is stored in the storage means 11 beforehand.

Referring to FIG. 5, the housing 3 is built in a panel unit 16, and the panel unit 16 is installed to the panel surface of an instrument panel of an automobile.

The operation of an in-car-device controller constructed as discussed above will now be described.

Referring back to FIG. 1, in the state wherein the switch units are installed in all the unit mounts 3*a* through 3*g* provided in the housing 3, if, for example, the top face surface of the first keytop 6*a* is depressed against the elastic force of a coil spring 8, then the first keytop 6*a* slides along the inner wall of the unit mount 3*a* toward the printed circuit board 1, causing the driving portion 9*a* of the first keytop 6*a* to press only the driving pin 4*c* of the control switch SW-A. This in turn causes one contact of the control switch SW-A to be closed by the driving pin 4*c*, and the unique recognition signal "001" is issued from the control switch SW-A to the control unit. In the control unit, based on the recognition signal "001", the detecting means 12 detects that the control switch SW-A has been turned ON. The function determining means 14 determines the control function of the first keytop 6*a* based on the data of the storage means 13, and the signal output means 15 outputs the control signal associated with the determined control function to conduct the traction control that has been at rest. In the state wherein the traction control is being carried out, if the control switch SW-A is depressed again (an operation for stopping the control), then the traction control is stopped.

Similarly, when the second keytop 6*b* is depressed, the driving portion 9*b* of the second keytop 6*b* depresses only the driving pin 4*b* of the control switch SW-B, so that the control switch SW-B outputs a unique recognition signal "010". Based on the recognition signal "010", the signal output means 15 of the control unit issues a control signal to the suspension control. Likewise, when the remaining keytops 6*c* through 6*g* are depressed, the control signals associated with the control functions assigned to the depressed keytops 6*c* through 6*g* are output in the same manner.

Thus, in an in-car-device controller according to this embodiment, the keytops 6*a* through 6*g* corresponding to the control switches SW-A through SW-G are provided with the driving portions 9*a* through 9*g* capable of simultaneously depressing any one of or a plurality of the driving pins 4*a* through 4*c* of the control switches SW-A through SW-G. This arrangement makes it possible to issue unique switch signals from the control switches SW-A through SW-G by using the combinations of the driving pins 4*a* through 4*c* and the driving portions 9*a* through 9*g*. Therefore, assigning, for example, the traction control function to the second control switch SW-B from the left in FIG. 1 can be accomplished simply by installing the first keytop

6*a* to the unit mount 3*b* without adding any changes to the control switches SW-A through SW-G or the control unit. With this arrangement, the operation process can be simplified, and the reliability of electrical connection can be improved.

In a state wherein one of the keytops 6*a* through 6*g* has been depressed and a unique switch signal has been issued from the associated one of the control switches SW-A through SW-G, and the associated control function is being conducted, if the keytop is removed from the unit mount to replace it, then the detection switch signal of the detection switch set on the unit mount from which the keytop has just been removed is switched from "1" to "0". This causes the keytop presence determiner 11 of the control unit to detect that the keytop has been removed, and the signal output means 15 issues a control signal to stop the control function. Hence, a user no longer has to check if the control functions associated with the keytops are being implemented when removing the keytops 6*a* through 6*g* from the unit mounts 3*a* through 3*g*. Furthermore, after removing a keytop from a unit mount, the user no longer has to mount the keytop back again to stop the control function associated with the keytop that has been removed. Thus, still easier replacement of a switch unit can be achieved in an in-car-device controller in which the type of a switch unit mounted on a unit mount is automatically recognized by the control unit.

In another configuration, it is possible to automatically stop the control functions associated with all keytops at the moment any one keytop is removed. This arrangement is advantageous for some applications because a user will be notified more clearly that a keytop has been replaced.

Second Embodiment

Figure 6:
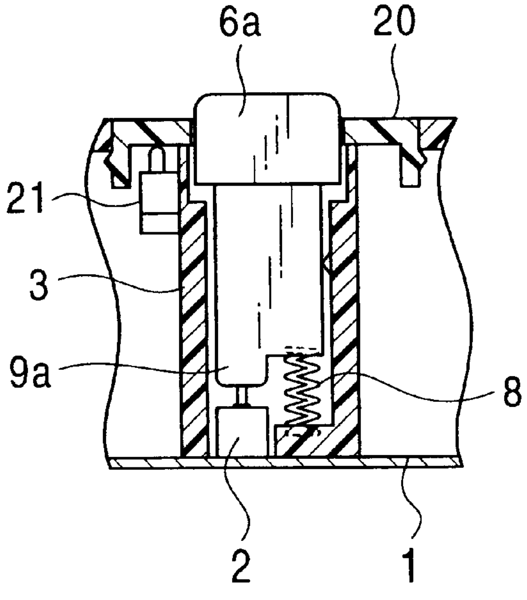
FIG. 6 is a sectional view of an essential section of an in-car-device controller according to a second embodiment.
Figure 7:
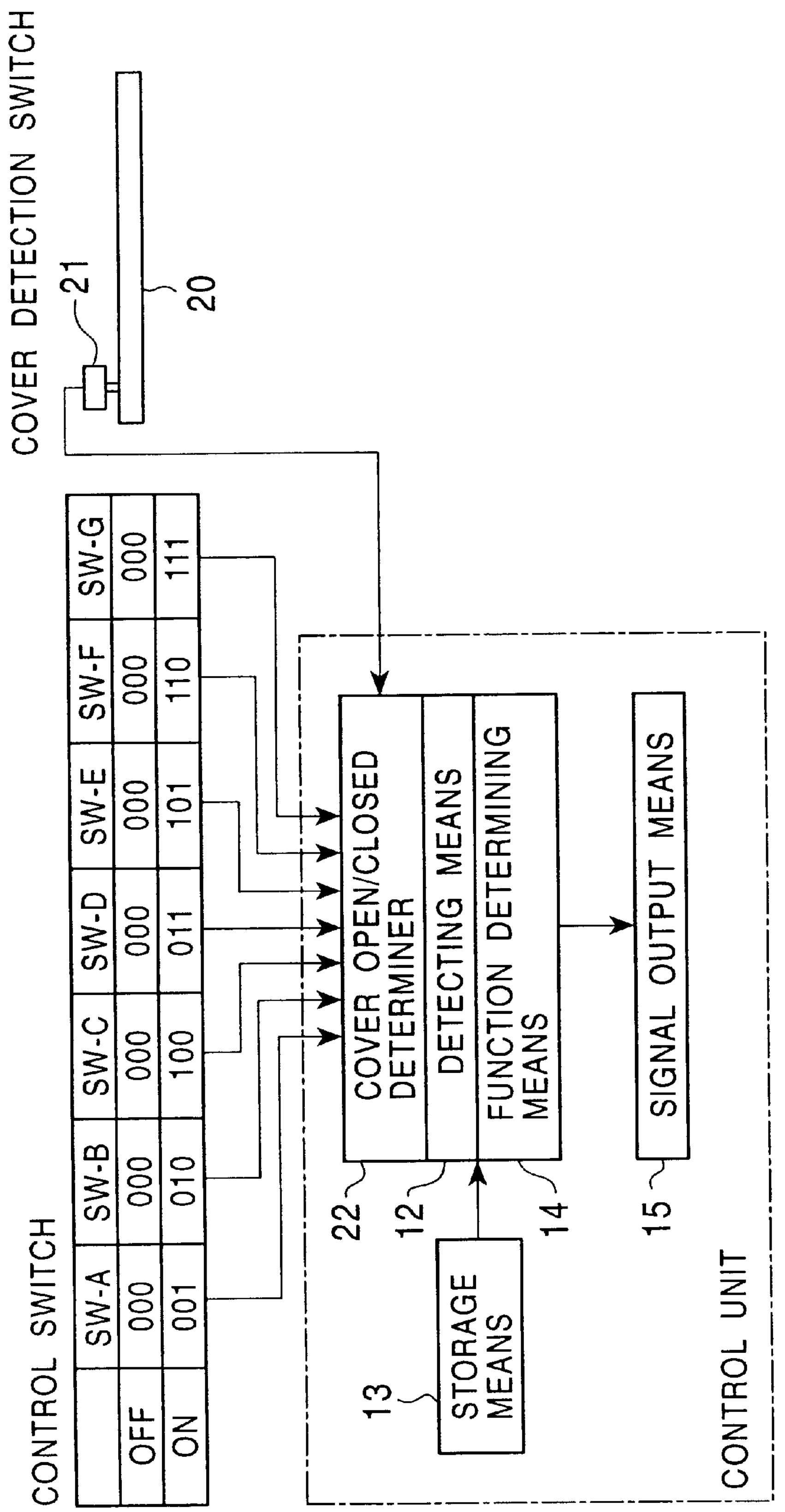
FIG. 7 is a block diagram of an in-car-device controller according to the second embodiment.

A second embodiment of an in-car-device controller in accordance with the present invention will now be described in conjunction with FIG. 6 and FIG. 7. FIG. 6 is a sectional view of an essential section of an in-car-device controller according to the second embodiment, and FIG. 7 is a block diagram of the in-car-device controller according to the second embodiment.

As demonstrated by the drawings, the in-car-device controller according to the second embodiment has a cover 20 provided at the front of a housing 3 so that it can be opened and closed, instead of providing the switch mounts 3*a* through 3*g* with the keytop detection switches 10*a* through 10*g*. A cover detection switch 21 is provided at a portion in contact with the cover 20. The cover detection switch 21 issues a signal "1" when the cover 20 is closed, while it issues a signal "0" when the cover is opened. In addition, a control unit is equipped with a cover open/closed determiner 22 that receives a cover detection switch signal from the cover detection switch 21. The rest of the configuration is the same as the configuration of the in-car-device controller according to the first embodiment, and the description thereof will not be repeated.

The operation of the in-car-device controller configured as discussed above will now be described. In the in-car-device controller according to the second embodiment, since the cover 20 is provided at the front of the housing 3 so that it may be opened and closed, a user has to always open the cover 20 to remove any one of keytops 6*a* through 6*g* from the unit mounts 3*a* through 3*g*. If the cover 20 is opened when any one of the control switches SW-A through SW-G has been depressed and its associated control function is being implemented, then a cover detection switch signal of the cover detection switch 21 is switched from "1" to "0". This causes the cover open/closed determiner 22 of the control unit to detect that the cover 20 has been opened, and a signal output means 13 issues a control signal to stop the control function. Therefore, when the user removes any one of the keytops 6*a* through 6*g* from the corresponding one of the unit mounts 3*a* through 3*g*, he or she does not have to check if the control function associated with the keytop is being implemented. Moreover, the moment the cover 20 is opened, the control functions associated with all the control switches SW-A through SW-G are automatically disabled. This arrangement obviates the need for placing a keytop back again in order to disable the control function associated with a control switch by turning OFF the corresponding one of the control switches SW-A through SW-G after removing the keytop from the unit mount.

Figure 8:
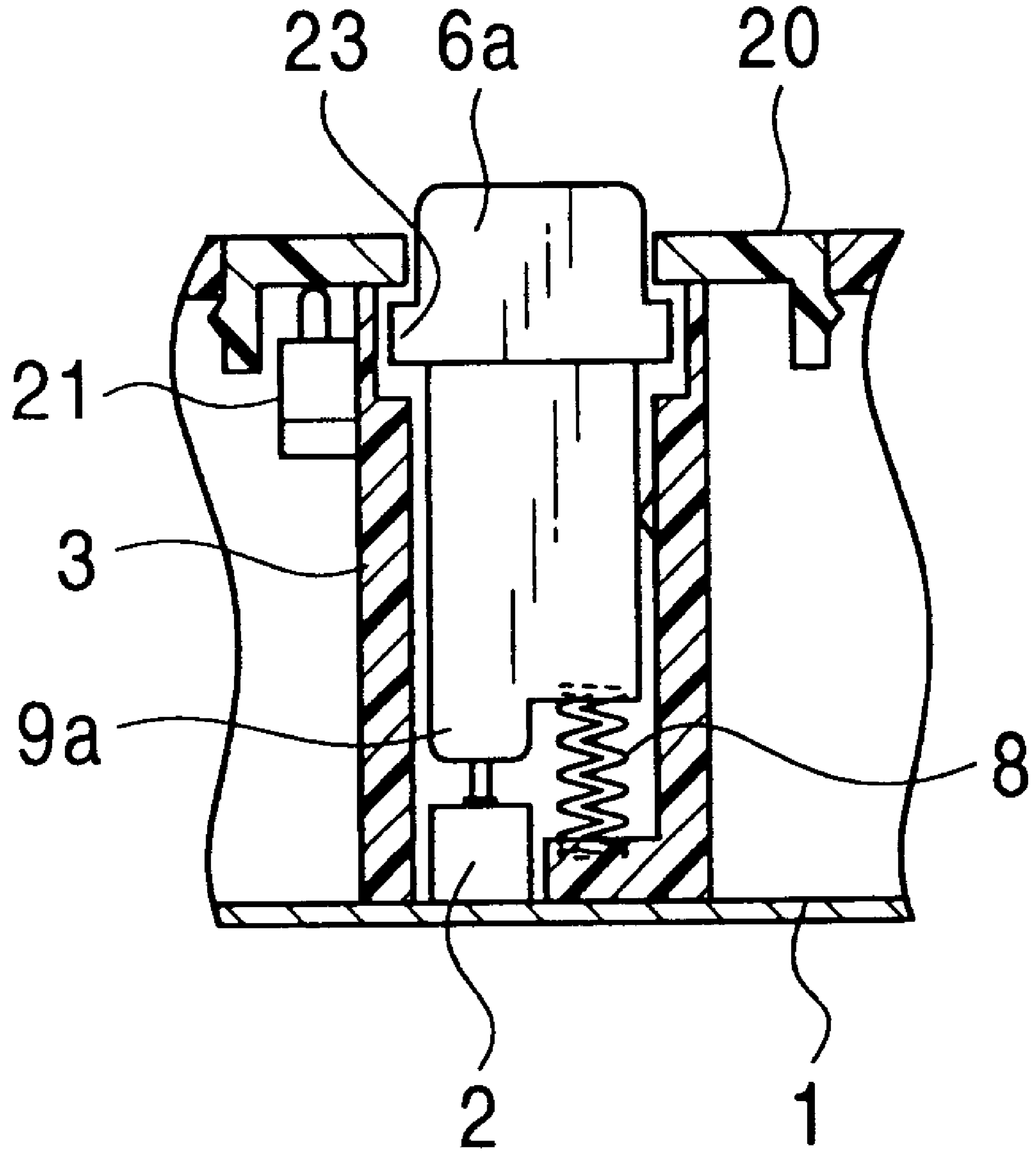
FIG. 8 is a sectional view of an essential section of an in-car-device controller according to a modification of the second embodiment.

The in-car-device controller according to the second embodiment is characterized by the cover 20 provided at the front of the housing 3 so that it may be opened or closed, and by the provision of the cover detection switch 21 and the cover open/closed determiner 22 for detecting and determining whether the cover 20 has been opened or closed. The rest of the configuration of the second embodiment can be modified, as necessary. For example, as shown in FIG. 8, the keytops 6*a* through 6*g* (only the keytop 6*a* is illustrated in FIG. 8) provided on the in-car-device controller in this embodiment may be equipped with engaging stepped portions 23 for engaging the cover 20. With this arrangement, no keytops 6*a* through 6*g* can be removed from the unit mounts 3*a* through 3*g* (only the unit mount 3*a* is illustrated in FIG. 8) when the cover 20 is in a closed state, making it possible to prevent the keytops 6*a* through 6*g* from accidentally coming off.

Thus, the in-car-device controller according to this embodiment provides the same advantage as that of the in-car-device controller according to the first embodiment, and further allows a reduced number of components and simplified interconnections to be achieved since it requires only one switch for determining the presence of keytops regardless of the number of the unit mounts, thus permitting reduced cost of an in-car-device controller. Moreover, the in-car-device controller according to this embodiment has the cover 20 provided at the front of all unit mounts, so that foreign matters entering into the unit mounts 3*a* through 3*g* can be reduced, and malfunction of the control switches 2 and short circuits of the printed circuit board can be prevented. This leads to higher durability and reliability.

Other Embodiments

Other embodiments of an in-car-device controller in accordance with the present invention will be briefly described.

(1) In one of the above embodiments, the removal of the keytops 6*a* through 6*g* from the unit mounts 3*a* through 3*g* is detected, or a preparatory operation for removing the keytops 6*a* through 6*g* from the unit mounts 3*a* through 3*g* is detected, and the control functions associated with the control switches SW-A through SW-G are automatically disabled. In the in-car-device controller in which the switch units having the keytops and the control switches integrally formed are installed to or removed from the unit mounts, the removal of the switch units from the unit mounts is detected, or a preparatory operation for removing the switch units from the unit mounts 3*a* through 3*g* is detected, and the control functions associated with the control switches are automatically disabled.

(2) In one of the above embodiments, one control switch 2 is provided with the three driving pins 4*a* through 4*c* to output seven different unique switch signals from the seven control switches SW-A through SW-G. It is possible, however, to increase or decrease the number of the driving pins, as necessary. In this case, if a single control switch is provided with an n (n is 2 or more) number of the driving pins, then $(2^n-1)$ different unique switch signals can be output by using the combinations of the driving pins and the driving portions of the keytops. This makes it possible to increase the types of control functions accordingly.

(3) In one of the above embodiments, the descriptions have been given of the case where the triple push switches, each having the three driving pins 4*a*, 4*b*, and 4*c* that project from the same enclosure, are employed as the control switches 2. Alternatively, however, in place of the triple push switches, three single-pin push switches, each having a single driving pin, may be arranged to form a set of control switches 2. The same applies when an n number of driving pins are used.

(4) In one of the above embodiments, the control switches SW-A through SW-G having a plurality of driving pins 4*a* through 4*c* and the keytops 6*a* through 6*g* equipped with the driving portions 9*a* through 9*g* for selectively operating one or multiple of the plural driving pins 4*a* through 4*c* are used as the means for making the control unit automatically recognize the types of the switch units. As an alternative means to such a construction, each of the plural types of the switch units may include an identifying element having a unique circuit constant so as to enable the control unit to detect a value dependent upon the circuit constant of the identifying element.

(5) Similarly, as the means for enabling the control unit to automatically recognize the types of the switch units, each of the plural types of the switch units may include a unique diode connection circuit so as to enable the control unit to detect a value dependent upon the diode connection circuit.

(6) Furthermore, there is another means for enabling the control unit to automatically recognize the types of the switch units. A plurality of types of the switch units may be composed of circuit boards on which predetermined circuit patterns including a plurality of pairs of land portions that can be shorted are formed, switches mounted on the circuit boards, and a shorting member for selectively shorting one of the plural pairs of the land portions. In this configuration, the control unit detects different shorting positions.

Thus, according to the present invention, in the in-car-device controller wherein the type of a switch unit is automatically identified by the control unit when the switch unit is mounted on the unit mount, if a switch unit or a keytop constituting part of the switch unit is removed from the unit mount, then an output signal from the detection switch for each unit mount is detected, and the control function associated with the control switch removed from the unit mount is switched to a disabled mode. Hence, when removing a switch unit or a keytop from a unit mount, a user no longer has to check if the associated control function has been turned OFF. Furthermore, after removing a switch unit or a keytop from a unit mount, the user no longer has to mount the switch unit or the keytop back again onto the same unit mount. Therefore, still easier replacement of a switch unit can be achieved in the in-car-device controller.

In addition, according to the present invention, the covers are provided at the front of the unit mounts, and the cover detection switch for detecting the opening and closing of the covers is provided. When the covers are opened, the output signals from the cover detection switch are detected, and the control functions associated with all the control switches mounted on the unit mounts are switched to the disabled mode. Hence, the same advantage as above will be obtained, and the number of detection switches can be minimized, making it possible to further simplify the configuration of an in-car-device controller. Moreover, the cover provided at the front of each unit mount reduces the chances of entry of foreign matters into the unit mounts, contributing to higher durability and reliability.

What is claimed is:

1. An in-car-device controller, comprising:

a plurality of types of switch units associated with different control functions;

a control switch and a keytop constituting each one of the switch units;

a plurality of unit mounts to which the switch units are individually installed;

detection switches individually provided on the plural unit mounts; and a control unit that automatically identifies the types of the switch units mounted on the unit mounts, detects a detection switch signal issued from one of the detection switches when a switch unit or a keytop constituting part of the switch unit is removed from a unit mount, and switches OFF at least the control function associated with the removed switch unit or keytop.

2. An in-car-device controller, comprising:

a plurality of types of switch units individually associated with different control functions;

a plurality of unit mounts to which the switch units are individually installed;

a single cover installed on a front surface of each of the plural unit mounts such that it can be opened and closed;

a cover detection switch for detecting the opening and closing of the cover; and a control unit that automatically identifies the type of a switch unit attached to the unit mount, detects a cover detection switch signal output from the cover detection switch when the cover is opened, and switches OFF the control functions associated with all switch units that have been installed to the unit mounts.

* * * * *